United States Patent [19]

Tryan et al.

[11] Patent Number: 5,389,864
[45] Date of Patent: Feb. 14, 1995

[54] ACTUATOR WITH MOTOR AND FEEDBACK DRIVEN BY A COMMON POWER SUPPLY

[75] Inventors: Fredrick W. Tryan, Lewiston; Erik W. Brom, Winona, both of Minn.

[73] Assignee: Lake Center Industries, Inc., Winona, Minn.

[21] Appl. No.: 38,858

[22] Filed: Mar. 29, 1993

[51] Int. Cl.6 ............................................. G05B 11/16
[52] U.S. Cl. .................... 318/562; 318/666; 318/668
[58] Field of Search ............... 318/560, 562, 599, 626, 318/627, 628, 663, 666, 667, 668, 671, 672

[56] References Cited

U.S. PATENT DOCUMENTS

| | | |
|---|---|---|
| 3,254,283 | 5/1966 | Hunt . |
| 3,653,059 | 3/1972 | Wade ............................ 318/663 X |
| 3,668,503 | 6/1972 | Lindner ............................ 318/665 |
| 3,743,912 | 7/1973 | Mashimo ............................ 318/599 |

Primary Examiner—Ro Bentsu
Attorney, Agent, or Firm—Dorn, McEachran, Jambor & Keating

[57] ABSTRACT

An actuator system has a motor and an output shaft connected to a potentiometer that provides shaft position information. The motor and potentiometer are electrically connected to a common power supply. A microcomputer controls the application of power to the motor and potentiometer so that feedback signals from the potentiometer, indicative of shaft position, can be read when desired without moving the shaft. The motor is prevented from moving either by setting both motor terminals high during a read, or by applying power pulses during a read which are too short in duration to allow the motor to start moving.

17 Claims, 3 Drawing Sheets

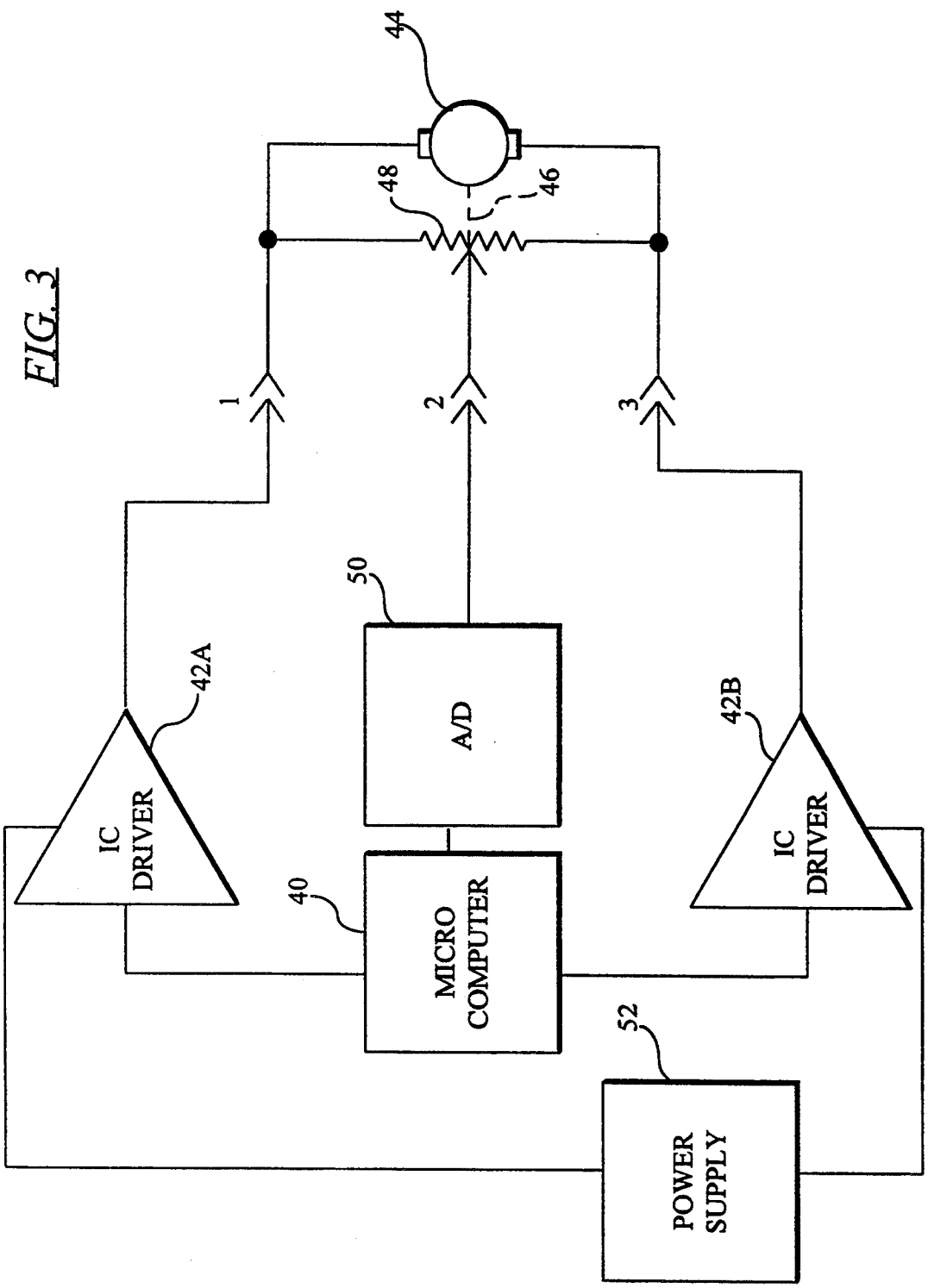

ACTUATOR WITH MOTOR AND FEEDBACK DRIVEN BY A COMMON POWER SUPPLY

BACKGROUND OF THE INVENTION

This invention relates to actuator systems of the type having an electric motor, typically connected to a gear train and an output shaft. Actuator systems are used to effect motion in a wide variety of applications. By way of example, actuators are used in automotive climate controls to set the various doors and louvers which will create the air flow desired by the user. These doors are used to blend heated, cooled or ambient air according to a selected temperature setting, and to direct the air to the selected vents.

Actuators are generally part of a control system that accepts instructions from a user and directs the movement of the actuators according to those instructions. The control system often needs to have information regarding the current position of an actuator. This can be provided by a potentiometer having a wiper movable with the output shaft of the actuator motor.

FIG. 1 shows a conventional five-wire actuator system. It has a microcomputer 10 with IC motor drivers 11 and an analog to digital converter 12. An actuator motor 13 is connected to the drivers 11 through pins 1 and 5. It will be understood that the motor has an output shaft connected to the device to be moved. The output shaft also carries the wiper 14 of a resistive-element potentiometer 15. The wiper is electrically connected to the A/D converter 12 through pin 3. A power supply 16 is connected to one side of the potentiometer through pin 2 while the other side is grounded through pin 4. A motor power supply 17 is connected to the two IC drivers 11.

In this system five wires are needed to connect the motor and potentiometer to the five pins. The output voltage on pin 3 is proportional to the rotational position of the actuator output shaft. Note that the potentiometer requires its own power supply 16, separate from the power supply 17 for the motor 13. The power supply 16 and its associated wiring add cost and complexity to the system. In some applications, such as the automotive climate control mentioned above, the costs can be about fifty cents per wire. The three-wire and four-wire systems of the present invention have been developed to minimize these costs.

SUMMARY OF THE INVENTION

The present invention concerns an actuator system for moving a driven device to a desired position and indicating the current position of the driven device.

A primary object of the invention is an actuator that eliminates the need for a separate feedback potentiometer power supply.

Another object of the invention is an actuator that reduces the number of required wire connections.

A further object of the invention is an actuator having a feedback potentiometer which is powered by a common power supply.

Yet another object of the invention is an actuator of the type described which uses a microcomputer programmed to allow it to measure the motor's position without moving the motor.

Another object is an actuator using a common power supply for the motor and potentiometer and wherein compensation is provided for variations in the power supply voltage.

These and other objects that may become apparent are realized by an actuator system of the type having a motor with first and second electrical terminals and an output shaft driven by the motor. A resistive-element potentiometer has a wiper actuated by the motor's output shaft. The potentiometer has first and second power terminals and a feedback terminal. A common power supply is connected to both the motor and potentiometer. A microcomputer is connected to the power supply and to the motor and potentiometer terminals for controlling the power applied thereto. The microcomputer can alternately cause movement of the output shaft or read a signal on the feedback terminal without moving the output shaft. This is accomplished even though both the motor and potentiometer are connected to the same power supply.

BRIEF DESCRIPTION OF THE DRAWINGS

FIG. 3 is a circuit diagram of a three-wire actuator system according to the present invention.

DETAILED DESCRIPTION OF THE INVENTION

Figure 1:
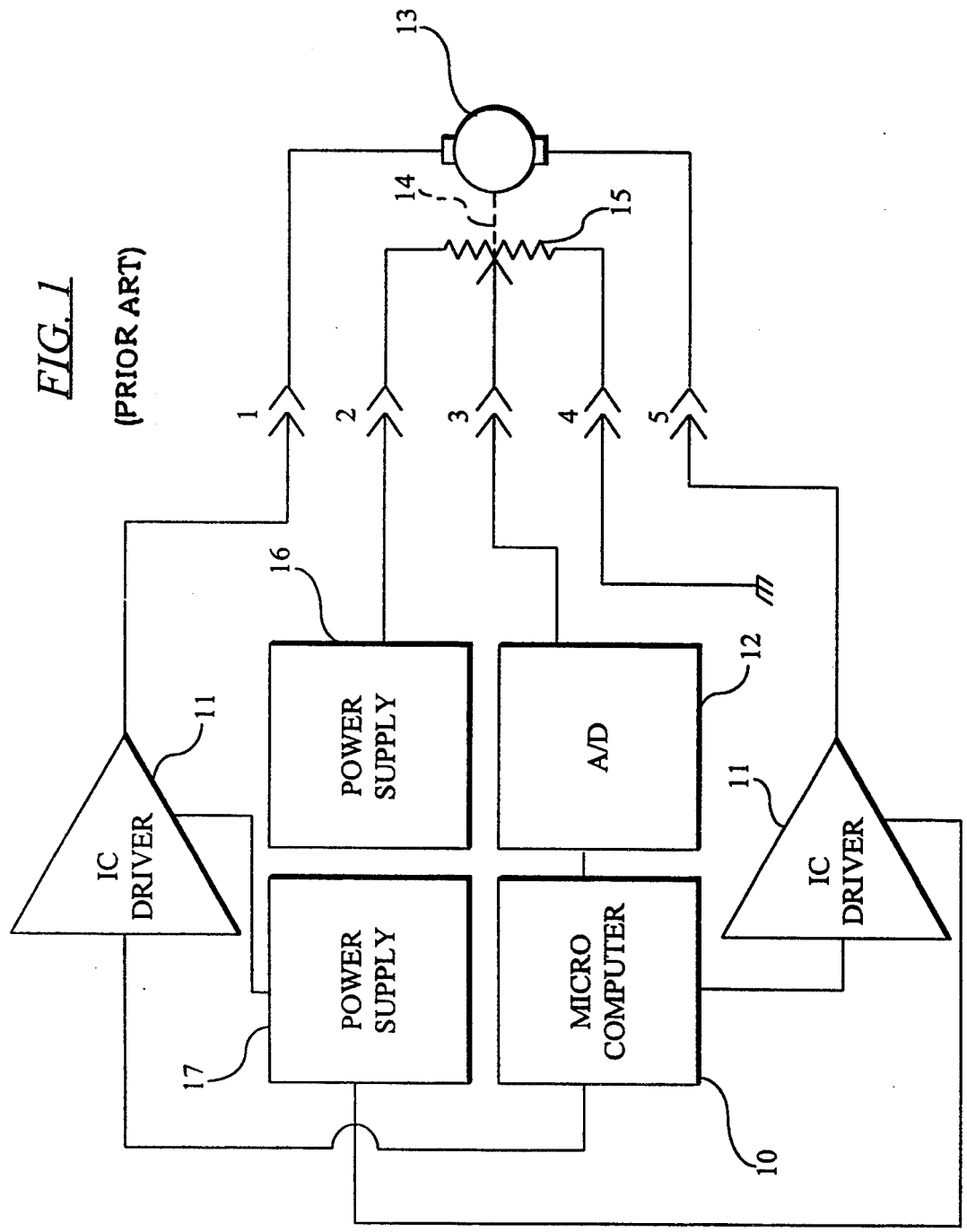
FIG. 1 is a circuit diagram of a five-wire actuator system according to the prior art.
Figure 2:
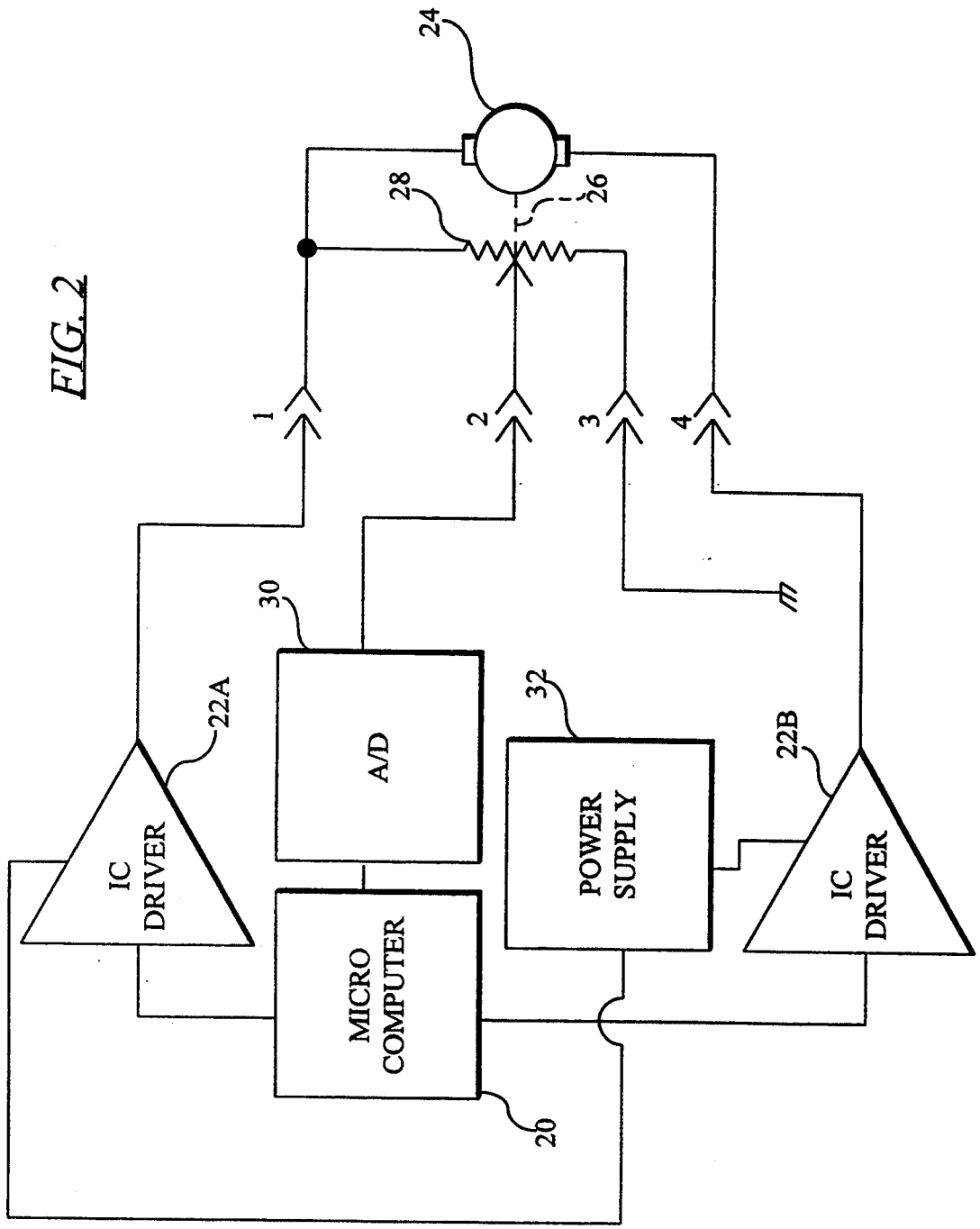
FIG. 2 is a circuit diagram of a four-wire actuator system according to the present invention.

A first embodiment of the actuator of the present invention in shown in FIG. 2. This is a four-wire actuator. A second embodiment showing a three-wire actuator will be described below. The four-wire actuator includes a microcomputer 20. By way of example only, the microcomputer can be a Motorola 68HC05B6. It is connected to two motor driver IC's 22A and 22B. These drivers are connected through pins 1 and 4 to the actuator motor 24. The motor's output shaft carries the wiper 26 of a potentiometer 28. The feedback voltage of the potentiometer is connected through pin 2 to an analog-to-digital converter 30, which passes the digital feedback signal to the microcomputer 20. One of the power inputs to the potentiometer 28 is connected to the IC driver 22A through pin 1. The other side of the potentiometer is connected to ground through pin 3. A power supply 32 is connected to each of the IC drivers 22. The power supply may be on the order of ten volts, although it could be otherwise.

To read the motor shaft position the motor is turned off and both motor drive lines, at pins 1 and 4, are placed at a high level. Placing motor pins 1 and 4 high prevents the motor from rotating while applying the power supply to the potentiometer input. Feedback voltage can then be read at pin 2 by the A/D converter 30. If the shaft is not in the desired position, the microcomputer will calculate how far to move the motor. The motor is then turned on for a predetermined time. Next the motor is turned off and a new position reading is taken. This process continues until the desired position is reached.

Since it is not possible to measure directly the power supply voltage and voltage drop across the motor IC drivers 22, a special calibration mode is used after the actuator is installed in its application. The calibration routine is as follows. The actuator is rotated to its maximum feedback voltage position. Then both motor drive lines are set high and the voltage on pin 2 at that actuator position is saved by the microcomputer. The actuator is then rotated to its minimum feedback voltage position, the drive lines are set high and the voltage at that position is saved. A calculation is performed dividing the total voltage differential by the number of degrees of travel available to the actuator. The calibration removes all system errors such as power supply voltage, voltage drop across the IC drivers, linkages, gear train errors and mounting errors.

When a new position is requested by the system the microcomputer determines the direction of travel needed to reposition the actuator. Then it calculates the desired position in accordance with:

Desired_Position=Requested_Position·(Highend−Lowend)+Lowend where:
Desired_Position is in feedback units (Volts or A/D counts);
Requested_Position is in percent;
Highend is the high end position read during calibration;
Lowend is the low end position read during calibration.

FIG. 3 illustrates a three-wire actuator system. It includes a microcomputer 40 connected to two motor driver IC's 42A and 42B. The drivers are connected through pins 1 and 3 to the actuator motor 44. The motor's output shaft carries the wiper 46 of a potentiometer 48. The feedback voltage of the potentiometer is connected through pin 2 to an analog-to-digital converter 50, which passes the digital feedback signal to the microcomputer 40. One of the power inputs to the potentiometer 48 is connected to the IC driver 42A through pin 1. The other side of the potentiometer is connected to IC driver 42B through pin 3. Thus, the potentiometer 48 is in a parallel circuit with the motor 44. A power supply 52 is connected to the IC drivers 42.

With the potentiometer and motor in parallel, theoretically when the potentiometer is powered, the motor is powered as well. This means that every time a potentiometer voltage is applied for position measurements the motor will be powered, causing the actuator output shaft to move. However, the motor has significant mass and requires power be applied for a predefined amount of time before the motor shaft will move. By applying a short voltage pulse across the motor/potentiometer terminals, the feedback position can be measured while the motor does not have sufficient time to move.

The width and timing of the pulse used to read position without motor movement is critical. If power is supplied for too short of a time, inaccurate A/D readings will occur. If power is applied for too long, the actuator will move. The microcomputer has A/D input and motor driver outputs to generate and control the pulse. When position information is required, the microcomputer generates the proper pulse.

The microcomputer A/D must measure the motor/potentiometer voltage at pins 1 and 3. Because the voltage applied to pins 1 and 3 is applied from a motor driver integrated circuit (or similar), some series voltage drop will be present and a reduced voltage will be applied to the motor and feedback potentiometer. An algorithm in the computer measures the actual applied voltage and the feedback signal and then calculates a precise actuator position.

In addition, the actuator is a reversing actuator. Reversing the direction of travel is accomplished by reversing the actuator motor voltage polarity. Reversing the motor voltage polarity reverses the feedback potentiometer voltage. The algorithm takes this into account as well, and provides a precise output position for either motor direction.

The steps for determining the pulse width and for calibrating the system will now be described. The terminology is given the following definitions. Negative direction means toward the end of motor travel with low voltage feedback; positive direction means toward the end with high voltage feedback. A negative pulse is one of the polarity needed to drive the motor in the negative direction, although it may or may not be long enough to cause motor movement. A positive pulse is one of the polarity needed to drive the motor in the positive direction. Again, a positive pulse may or may not be long enough to actually move the motor. The negative end is the actuator's lowest feedback voltage position. The positive end is the actuator's highest feedback voltage position.

To determine the pulse width for reading potentiometer feedback voltage without moving the actuator, the microcomputer is programmed to perform the following steps. Drive the actuator approximately to its center position. Output a very small pulse (one known to be too short to cause movement) and read and store the position. Increment the pulse width, output the new pulse, and read the position. Compare the new reading with the previous reading. If the readings are not the same, repeat the incrementing and comparing steps. When successive readings are the same, define the latest reading as the minimum pulse required to get a valid A/D reading.

At this point the pulse width is incremented again and output. If the actuator did not move, repeat the incrementing and output step. When the actuator does move, define the latest pulse width as the maximum allowed. Then compute the average of the minimum and maximum pulses and use it as the readout power pulse width for taking A/D readings. As a frame of reference, one system familiar to the inventors produced a readout pulse width on the order of fifty microseconds, although it will be understood that this may vary from one system to the next.

To calibrate the system, the following steps are performed. Turn the actuator on, drive it to the negative end, and turn it off. Output a negative pulse, read and record the feedback voltage (call it LOW$_{NEG}$). Then output a positive pulse, read and record the feedback voltage (LOW$_{POS}$). Turn the actuator on, drive it to the positive end, and turn it off. Output a negative pulse, read and record the feedback voltage (HIGH$_{NEG}$) and then do the same with a positive pulse (HIGH$_{POS}$). The voltage read is the supply voltage minus the driver voltage drop.

A reference voltage V$_{PS}$(Ref) is defined by the difference between feedback voltage readings taken first with both drive lines high and then with the drive lines low.

When a new actuator position is requested by the system, the following actions take place. A current power supply voltage V$_{PS}$(Now) reading is taken by the procedure just described for the references voltage. The direction of travel needed to reposition the actuator is determined. The new desired position is calculated as follows:

$$\text{Desired\_Position} = \frac{V_{PS}(\text{NOW})}{V_{PS}(\text{REF})}.$$

$$[\text{Req\_Position} \cdot (\text{HIGH}_{DIR} - \text{LOW}_{DIR}) + \text{LOW}_{DIR}]$$

where:
- Desired_Position is in feedback units (volts or A/D counts);
- Reg_Position is the requested position in percent;
- $\text{HIGH}_{DIR}$ is either $\text{HIGH}_{POS}$ or $\text{HIGH}_{NEG}$ depending on direction of travel;
- $\text{LOW}_{DIR}$ is either $\text{LOW}_{POS}$ or $\text{LOW}_{NEG}$ depending on direction of travel.

Pulses having a length of about one to two hundred milliseconds, for example, are used to move the actuator. Then a new position reading is taken and checked against the desired position. This procedure is repeated until the desired position is reached.

It can be seen that both the four-wire and three-wire embodiments of the present invention eliminate one or more wires and the need for a separate power supply. While a preferred embodiment of the invention has been shown and described, it will be understood that alterations could be made thereto without departing from the scope of the following claims.

We claim:

1. In an actuator system of the type having a motor with first and second electrical terminals and an output shaft driven by the motor, a potentiometer actuated by the output shaft and having first and second power terminals and a feedback terminal, a common power supply for the motor and the potentiometer, and control means connected to the power supply and the motor and the potentiometer terminals for controlling the power applied thereto so as to alternately move the output shaft and read a signal on the feedback terminal without moving the output shaft.

2. The system of claim 1 further characterized in that the control means is a microcomputer.

3. The system of claim 2 further comprising an analog-to-digital converter connected between the feedback terminal and the microcomputer.

4. An actuator system, comprising:
   - a motor having first and second electrical terminals and an output shaft driven by the motor;
   - a potentiometer actuated by the output shaft and having first and second power terminals and a feedback terminal;
   - a power supply having high and low voltage outputs;
   - first and second motor driver circuits for selectively connecting the high and low voltage outputs of the power supply to the first and second terminals of the motor, and for selectively connecting the high and low voltage outputs to one of the first and second power terminals of the potentiometer, the other power terminal of the potentiometer being connected to ground;
   - a control means connected to the driver circuits and the feedback terminal of the potentiometer for controlling the driver circuits to set one motor terminal high and the other motor terminal low when it is desired to move the output shaft and to set both motor terminals high when it is desired to read a signal on the feedback terminal without moving the output shaft.

5. The system of claim 4 further characterized in that the control means is a microcomputer.

6. The system of claim 5 further comprising an analog-to-digital converter connected between the feedback terminal and the microcomputer.

7. In an actuator system of the type having a motor with first and second electrical terminals and an output shaft driven by the motor, a potentiometer actuated by the output shaft and having first and second power terminals and a feedback terminal, a power supply having high and low outputs, a method of operating the actuator system with a common power supply for the motor and the potentiometer, comprising the steps of:
   - electrically connecting one potentiometer power terminal and one of the motor terminals to one another and to the power supply and connecting the other potentiometer power terminal to ground;
   - setting one motor terminal high and the other motor terminal low when it is desired to move the shaft; and
   - setting both motor terminals high and reading the signal on the feedback terminal when it is desired to determine the output shaft position.

8. The method of claim 7 further comprising the step of calibrating the actuator system.

9. The method of claim 8 wherein the calibration step is characterized by:
   a) setting the first motor terminal high and the second motor terminal low until the output shaft reaches a limit;
   b) setting both motor terminals high and reading the feedback signal;
   c) setting the first motor terminal low and the second motor terminal high until the output shaft reaches a limit;
   d) setting both motor terminals high and reading the feedback signal.

10. The method of claim 9 further including the step of updating the calibration feedback readings whenever the output shaft is driven to a limit to compensate for electrical or mechanical changes.

11. An actuator system, comprising:
   - a motor having first and second electrical terminals and an output shaft driven by the motor;
   - a potentiometer actuated by the output shaft and having first and second power terminals and a feedback terminal;
   - a power supply having high and low voltage outputs;
   - a first motor driver circuit for selectively connecting one of the high or low voltage outputs of the power supply to one of the first and second terminals of the motor and to one of the first and second power terminals of the potentiometer;
   - a second motor driver circuit for selectively connecting the other of the high or low voltage outputs to the other terminal of the motor;
   - the other power terminal of the potentiometer being connected to the second-motor driver circuit;
   - a control means connected to the driver circuits and the feedback terminal of the potentiometer for controlling the driver circuits to output power pulses long enough to move the output shaft, and to output readout power pulses short enough to read a signal on the feedback terminal without moving the output shaft.

12. The system of claim 11 further characterized in that the control means is a microcomputer.

13. The system of claim 12 further comprising an analog-to-digital converter connected between the feedback terminal and the microcomputer.

14. In an actuator system of the type having a motor with first and second electrical terminals and an output shaft driven by the motor, a potentiometer actuated by the output shaft and having first and second power terminals and a feedback terminal, a method of operating the actuator system with a common power supply for the motor and the potentiometer, comprising the steps of:

selectively connecting a high voltage output of the power supply to one of the first and second terminals of the motor and to one of the first and second power terminals of the potentiometer;

selectively connecting a low voltage output of the power supply to the other terminal of the motor;

connecting the other power terminal of the potentiometer to the low voltage output of the power supply;

outputting a motion power pulse long enough to move the output shaft when it is desired to move the shaft; and outputting a readout power pulse short enough to read a feedback signal on the feedback terminal without moving the output shaft when it is desired to determine the output shaft position.

15. The method of claim 14 wherein the readout power pulse width is determined by:

a) placing the output shaft in a central position between positive and negative limits;

b) outputting a first pulse too short to move the output shaft and reading a first feedback signal;

c) outputting a second pulse of increased width compared to the width of the first pulse and reading a second feedback signal;

d) comparing the first and second feedback signals and if they are not equal, incrementing the pulse width and repeating step (c);

e) saving the pulse width that produces equal readings as a minimum pulse;

f) incrementing the pulse width from the minimum, outputting the new width pulse and checking for output shaft movement;

g) repeating step (f) as needed until the output shaft moves and designating the width causing movement as the maximum pulse;

h) computing the readout power pulse by taking the average of the minimum and maximum pulses.

16. The method of claim 14 further including a calibration step characterized by:

a) driving the output shaft to a limit with low voltage feedback and then turning the motor off;

b) outputting a negative readout pulse and then a positive readout pulse and recording the feedback signals for each;

c) driving the output shaft to a limit with high voltage feedback and then turning the motor off;

d) repeating step (b).

17. The method of claim 14 further including the steps of:

a) calibrating the actuator system by reading the feedback signals with the output shaft placed in limit positions;

b) reading a reference power supply voltage at the time of calibration; and c) compensating for power supply variations at the time of movement of the output shaft to a new requested position by reading a current power supply voltage at the time of movement of the output shaft and applying the ratio of current power supply voltage to reference power supply voltage to the requested position data.

* * * * *